United States Patent
Min

(10) Patent No.: US 11,880,866 B2
(45) Date of Patent: Jan. 23, 2024

(54) ELECTRONIC APPARATUS FOR PROVIDING ADVERTISEMENT THROUGH VOICE ASSISTANT AND CONTROL METHOD THEREOF

(71) Applicant: SAMSUNG ELECTRONICS CO., LTD., Suwon-si (KR)

(72) Inventor: Bumki Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/521,391

(22) Filed: Nov. 8, 2021

(65) Prior Publication Data

US 2022/0148034 A1 May 12, 2022

Related U.S. Application Data

(63) Continuation of application No. PCT/KR2021/013707, filed on Oct. 6, 2021.

(30) Foreign Application Priority Data

Nov. 12, 2020 (KR) .................. 10-2020-0150834
Feb. 10, 2021 (KR) .................. 10-2021-0019126

(51) Int. Cl.
*G06Q 30/00* (2023.01)
*G06Q 30/0251* (2023.01)
*G10L 15/22* (2006.01)

(52) U.S. Cl.
CPC ..... *G06Q 30/0256* (2013.01); *G06Q 30/0267* (2013.01); *G06Q 30/0271* (2013.01);
(Continued)

(58) Field of Classification Search
CPC ............... G10L 15/22; G10L 2015/221; G10L 2015/223
See application file for complete search history.

(56) References Cited

U.S. PATENT DOCUMENTS 9,058,616 B2 6/2015 Yang
9,456,254 B2 9/2016 Sung et al.
(Continued)

FOREIGN PATENT DOCUMENTS

JP 2002-288527 A 10/2002
JP 6289563 B2 3/2018
(Continued)

OTHER PUBLICATIONS

International Search Report (PCT/ISA/210) and Written Opinion (PCT/ISA/237) dated Jan. 28, 2022 issued by the International Searching Authority in International Application No. PCT/KR2021/013707.

*Primary Examiner* — Alvin L Brown
(74) *Attorney, Agent, or Firm* — Sughrue Mion, PLLC

(57) ABSTRACT

An electronic apparatus includes a microphone, a speaker, a memory, and a processor. The processor obtains a product keyword from a text converted from a user voice that is input through the microphone, identify a product category related to the product keyword; determine whether to provide an advertisement related to the user voice based on an interest level of the user according to utterance history information and an advertisement fatigue level of the user; and based on a determination to provide the advertisement, obtain advertisement information based on a target product category identified according to the interest level of the user, and control the speaker to output an advertisement voice based on the advertisement information.

15 Claims, 18 Drawing Sheets

(52) U.S. Cl.
CPC ........ *G10L 15/22* (2013.01); *G10L 2015/221* (2013.01); *G10L 2015/223* (2013.01)

(56) References Cited

U.S. PATENT DOCUMENTS

| | | | |
|---|---|---|---|
| 10,891,662 | B2 | 1/2021 | Bayer et al. |
| 11,042,922 | B2 | 6/2021 | Onoro Rubio et al. |
| 11,580,585 | B1* | 2/2023 | Rajana ............... G06Q 30/0627 |
| 2013/0304541 | A1* | 11/2013 | Sloan ............... G06Q 30/0202 |
| | | | 705/7.31 |
| 2015/0317699 | A1 | 11/2015 | Tian et al. |
| 2016/0171542 | A1* | 6/2016 | Fanous ............. G06Q 30/0269 |
| | | | 705/14.54 |
| 2019/0205964 | A1 | 7/2019 | Onoro Rubio et al. |
| 2020/0117675 | A1 | 4/2020 | Tang et al. |
| 2021/0183366 | A1* | 6/2021 | Reinspach ............. G10L 15/22 |
| 2021/0193110 | A1 | 6/2021 | Park et al. |
| 2021/0295364 | A1* | 9/2021 | Veettil ................ G06Q 30/0282 |
| 2021/0406761 | A1* | 12/2021 | Yang .................. G06Q 30/0251 |

FOREIGN PATENT DOCUMENTS

| | | | |
|---|---|---|---|
| JP | 2019125364 A | 7/2019 | |
| JP | 2019-200598 A | 11/2019 | |
| KR | 10-0775680 B1 | 11/2007 | |
| KR | 10-1127205 B1 | 3/2012 | |
| KR | 1020120140587 A | 12/2012 | |
| KR | 10-1385316 B1 | 4/2014 | |
| KR | 10-1483191 B1 | 1/2015 | |
| KR | 10-1514728 B1 | 4/2015 | |
| KR | 10-1597248 B1 | 2/2016 | |
| KR | 10-1649067 B1 | 8/2016 | |
| KR | 1020190094314 A | 8/2019 | |
| KR | 1020200007917 A | 1/2020 | |
| KR | 1020200063646 A | 6/2020 | |

* cited by examiner

FIG. 4A 122-1

| UTTERANCE TIME | PRODUCT KEYWORD | PRODUCT CATEGORY (1 level) | PRODUCT CATEGORY (2 level) |
|---|---|---|---|
| 2020-07-03 09:05 | CAR ZZ | CAR MANUFACTURED BY I | CAR |
| 2020-07-03 09:07 | CAR ZZ | CAR MANUFACTURED BY I | CAR |
| 2020-07-05 19:55 | CAR ZZZ | CAR MANUFACTURED BY K | CAR |
| 2020-07-05 19:56 | CAR ZZ | CAR MANUFACTURED BY I | CAR |
| 2020-07-08 11:22 | CAR T | CAR MANUFACTURED BY J | CAR |
| 2020-07-08 15:09 | CAR T | CAR MANUFACTURED BY J | CAR |
| 2020-07-08 15:09 | CAR T | CAR MANUFACTURED BY J | CAR |
| 2020-07-09 09:01 | CAR P | CAR MANUFACTURED BY J | CAR |
| 2020-07-11 16:41 | CAR X | CAR MANUFACTURED BY H | CAR |

FIG. 4B

| PRODUCT CATEGORY | INTEREST LEVEL |
|---|---|
| CAR | 0.04*9 = 0.36 |
| CAR MANUFACTURED BY I | 0.1*3 = 0.3 |
| CAR MANUFACTURED BY H | 0.1*1 = 0.1 |
| CAR MANUFACTURED BY B | 0.0 |

FIG. 5A 122-2

| UTTERANCE TIME | PRODUCT KEYWORD | ATTRIBUTE KEYWORD | ATTRIBUTE |
|---|---|---|---|
| 2020-07-03 09:05 | CAR ZZ | COLOR | COLOR |
| 2020-07-03 09:07 | CAR ZZ | RELEASE DATE | RELEASE DATE |
| 2020-07-05 19:55 | CAR ZZZ | PRICE | PRICE |
| 2020-07-05 19:56 | CAR ZZ | DISCOUNT | PRICE |
| 2020-07-08 11:22 | CAR T | RELEASE DATE | RELEASE DATE |
| 2020-07-08 15:09 | CAR T | FUEL EFFICIENCY | FUEL EFFICIENCY |
| 2020-07-08 15:09 | CAR T | HOW MUCH | PRICE |
| 2020-07-09 09:01 | CAR P | RELEASE DATE | RELEASE DATE |
| 2020-07-11 16:41 | CAR X | PRICE | PRICE |

FIG. 5B

| ATTRIBUTE | INTEREST LEVEL |
|---|---|
| PRICE | 0.4 |
| RELEASE DATE | 0.3 |
| FUEL EFFICIENCY | 0.1 |
| COLOR | 0.1 |

FIG. 6A 123-1

| ADVERTISEMENT TIME | ADVERTISEMENT TARGET |
|---|---|
| 2020-07-03 09:06 | CAR ZZZ |
| 2020-07-05 19:56 | CAR T |
| 2020-07-06 19:02 | COMPANY F (BRAND NAME OF BAG) |
| 2020-07-07 11:23 | SHOES C |
| 2020-07-08 15:10 | CAR P |
| 2020-07-11 11:41 | AMUSEMENT PARK D |

ADVERTISEMENT FATIGUE LEVEL: $0.05 * 6(TIMES) = 0.3$

FIG. 6B

| PRODUCT CATEGORY | ADVERTISEMENT CONCENTRATION LEVEL (= INTEREST LEVEL - ADVERTISEMENT FATIGUE LEVEL) |
|---|---|
| CAR | 0.36 - 0.3 = 0.06 |
| CAR MANUFACTURED BY I | 0.3 - 0.3 = 0 |

FIG. 7B

| PRODUCT CATEGORY | RELEVANCE LEVEL (=1/distance) |
|---|---|
| CAR MANUFACTURED BY H | 1/2 = 0.5 |
| CAR | 1/(2+4) = 0.167 |
| CAR MANUFACTURED BY I | 1/(2+4+4) = 0.1 |
| CAR MANUFACTURED BY B | 1/(2+4+4) = 0.1 |
| VEHICLE | 1/(2+4+6) = 0.083 |
| MOTORCYCLE | 1/(2+4+6+6) = 0.056 |

FIG. 8

| PRODUCT CATEGORY | INTEREST LEVEL<br>(= INTEREST LEVEL+RELEVANCE LEVEL) |
|---|---|
| CAR | 0.36 + 0.167 = 0.527 |
| CAR MANUFACTURED BY I | 0.3 + 0.1 = 0.4 |
| CAR MANUFACTURED BY H | 0.1 + 0.5 = 0.6 |
| CAR MANUFACTURED BY B | 0.0 + 0.1 = 0.1 |

FIG. 9

| PRODUCT CATEGORY | ADVERTISEMENT CONCENTRATION LEVEL (= INTEREST LEVEL - ADVERTISEMENT FATIGUE LEVEL) |
|---|---|
| CAR MANUFACTURED BY H | 0.6 - 0.3 = 0.3 |
| CAR | 0.527 - 0.3 = 0.227 |

ELECTRONIC APPARATUS FOR PROVIDING ADVERTISEMENT THROUGH VOICE ASSISTANT AND CONTROL METHOD THEREOF

CROSS-REFERENCE TO RELATED APPLICATION(S)

This application is a bypass continuation of International Application No. PCT/KR2021/013707, filed on Oct. 6, 2021, which is based on and claims priority to Korean Patent Application No. 10-2020-0150834, filed on Nov. 12, 2020 and Korean Patent Application No. 10-2021-0019126, filed on Feb. 10, 2021, in the Korean Intellectual Property Office, the disclosure of which are incorporated by reference herein in their entireties.

BACKGROUND

1. Field

The disclosure relates to an electronic apparatus which provides an advertisement voice, and more particularly to an electronic apparatus which provides an advertisement voice according to a content of an input user voice.

2. Description of the Related Art

Along with distribution of a large amount of smartphones, smart speakers, and the like, the practical use of voice assistant services is increasing, and an increasing percentage of searches occurs through voice assistants.

An interactive service provides an interactive advertisement voice and a voice search, and the features of providing an interactive advertisement voice is emerging as a new business model for advertisement.

For the interactive advertisement, there is no fixed space to display an advertisement, unlike in online image-based advertisement such as search advertisement, print advertisement, and the like of the related art, and therefore, it is necessary to directly determine whether to deliver advertisement according to a dialogue content with a user.

However, the related art merely focuses on delivering advertisement produced in advance for the interactive advertisement, and thus, a conversation between a voice assistant and a user languishes and it causes uncomfortable feeling.

SUMMARY

The disclosure provides an electronic apparatus and a control method for outputting an advertisement according to a dialogue content with a user when it is determined that advertisement fatigue has not occurred.

The disclosure provides an electronic apparatus and a control method for selecting a target product or service of an advertisement according to a past utterance history of a user and outputs an advertisement voice regarding the target product or service that the user is interested in.

In accordance with an aspect of the disclosure, there is provided an electronic apparatus including a microphone, an audio outputter, a memory storing a knowledge graph including information on a plurality of product categories corresponding to a plurality of products, utterance history information obtained based on a user voice that is through the microphone, and advertisement history information on an advertisement provided through the audio outputter, and a processor.

The processor may be configured to obtain at least one product keyword from a text converted from the user voice that is input through the microphone; identify one or more product categories related to the at least one product keyword, from among the plurality of product categories, based on the knowledge graph; determine whether to provide an advertisement related to the user voice based on an interest level of the user in the identified one or more product categories that is obtained according to the utterance history information and an advertisement fatigue level of the user obtained according to the advertisement history information; and based on a determination to provide the advertisement, obtain advertisement information based on a target product category identified according to the interest level of the user from among the identified one or more product categories, and control the speaker to output an advertisement voice based on the advertisement information.

In accordance with another aspect of the disclosure, there is provided a method for controlling an electronic apparatus including a memory storing a knowledge graph including information on a plurality of product categories corresponding to a plurality of products, utterance history information obtained based on a user voice that is input through a microphone, and advertisement history information on a past advertisement provided through a speaker, the method including: obtaining at least one product keyword from a text converted from the user voice that is input through the microphone; identifying one or more product categories related to the at least one product keyword, from among the plurality of product categories, based on the knowledge graph; determining whether to provide an advertisement related to the user voice based on an interest level of a user in the identified one or more product categories that is obtained according to the utterance history information and an advertisement fatigue level of the user obtained according to the advertisement history information; based on a determination to provide the advertisement, obtaining advertisement information based on a target product category identified according to the interest level of the user from among the identified one or more product categories; and outputting an advertisement voice via the speaker based on the advertisement information.

The electronic apparatus and the control method thereof according to the disclosure provide an advertisement voice that reflects a user's interest without interfering with the user's dialogue content.

The electronic apparatus and the control method thereof according to the disclosure provide an advertisement voice based on a determination that advertisement fatigue has not occurred to the user, so as to prevent the user from hating the advertisement and stopping paying attention to it, causing the effectiveness of the advertisement to decrease.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4A is a table showing utterance history information of a user who utters product keywords of various product categories that is input through a microphone according to an embodiment;

FIG. 4B is a table for describing an operation in which the electronic apparatus determines an interest level for each product category according to the utterance history information of the user according to an embodiment;

FIG. 5A is a table showing utterance history information of the user who utters various attribute keywords that is input through the microphone according to an embodiment;

FIG. 5B is a table for describing an operation in which the electronic apparatus determines an interest level for each attribute according to the utterance history information of the user according to an embodiment;

FIG. 6A is a table showing advertisement history information of an advertisement voice provided through an audio outputter according to an embodiment;

FIG. 6B is a table for describing an operation in which the electronic apparatus determines whether to provide an advertisement according to a history in which the advertisement voice is provided according to an embodiment;

FIG. 7B is a table for describing an operation in which the electronic apparatus determines a relevance level between a currently input product keyword and each product category by using the knowledge graph of FIG. 7A according to an embodiment;

FIG. 8 is a table for describing an operation in which the electronic apparatus updates the relevance level for each product category by using the determined relevance level according to an embodiment;

FIG. 9 is a table for describing an operation in which the electronic apparatus calculates an advertisement concentration level on each product category in consideration of the interest level and an advertisement fatigue level according to an embodiment;

DETAILED DESCRIPTION

Figure 1:
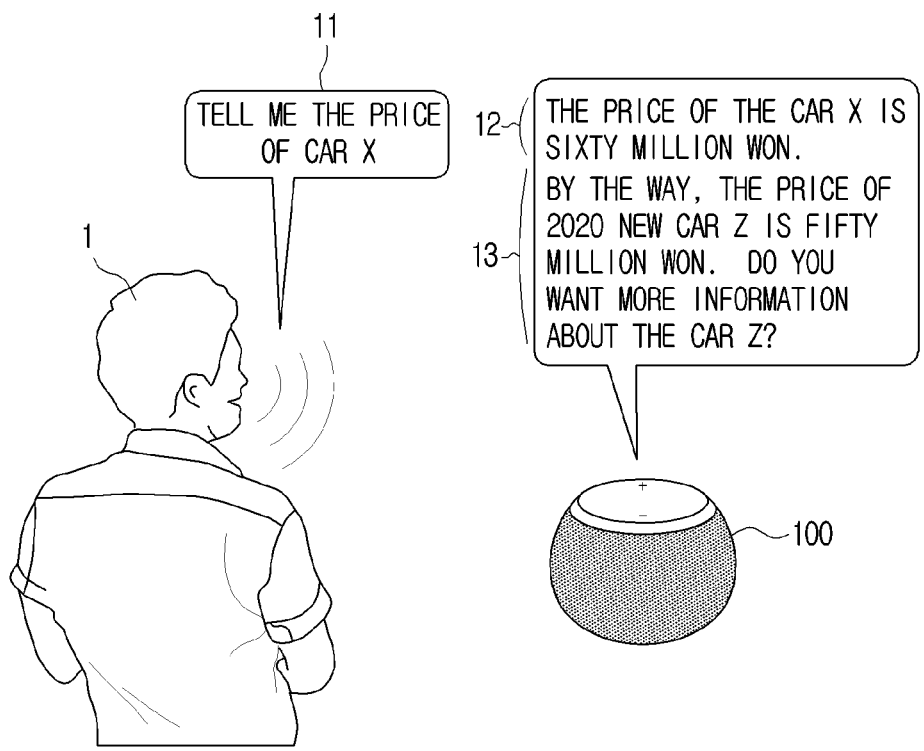
FIG. 1 is a diagram schematically illustrating an operation example of an electronic apparatus according to an embodiment.

Embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

The terms used in the specification and claims have been selected as general terms as possible in consideration of functions in the embodiments of the disclosure. But, these terms may vary in accordance with the intention of those skilled in the art, the precedent, technical interpretation, the emergence of new technologies and the like. In addition, there are also terms arbitrarily selected by the applicant. Such terms may be interpreted as meanings defined in this specification and may be interpreted based on general content of the specification and common technical knowledge of the technical field, if there are no specific term definitions.

In addition, terms including ordinals such as "first" or "second" may be used for distinguishing components in the specification and claims. Such ordinals are used for distinguishing the same or similar components and the terms should not be limitedly interpreted due to the use of ordinals. For example, in regard to components with such ordinals, usage order or arrangement order should not be limitedly interpreted with the numbers thereof. The ordinals may be interchanged, if necessary.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module", a "unit", or a "part" in the disclosure is for designating a component executing at least one function or operation, and such a component may be implemented as hardware, software, or a combination of hardware and software. Further, except for when each of a plurality of "modules", "units", "parts" and the like needs to be realized in an individual specific hardware, the components may be integrated in at least one module or chip and be implemented in at least one processor.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

In addition, in the embodiments of the disclosure, connection of a certain part to another part may include indirect connection via still another medium, in addition to direct connection. When it is described that a certain part includes another certain part, it implies that a still another part may be further included, rather than excluding it, unless otherwise noted.

FIG. 1 is a diagram schematically illustrating an operation example of an electronic apparatus 100 according to an embodiment.

FIG. 1 illustrates the electronic apparatus 100 implemented as a smart speaker and a user 1. The electronic apparatus 100 may provide a voice assistant service which responds to a question of the user 1.

Referring to FIG. 1, when the user 1 inputs a question voice 11 of "Tell me the price of car X", the electronic apparatus 100 may provide a response voice 12 "The price of the car X is sixty million won".

Specifically, the electronic apparatus 100 may extract keywords such as "car X", "price", and the like from the user's question voice 11 and provide information on the extracted keywords (e.g., sixty million won) as the response voice 12.

The electronic apparatus 100 may obtain advertisement information related to the keywords ("car X" and "price") included in the user's question voice 11.

After the response voice 12 is output, the electronic apparatus 100 may additionally output an advertisement voice 13 "By the way, the price of 2020 new car Z is fifty million won. Do you want more information about the car Z?"

As described above, the electronic apparatus 100 according to the disclosure may provide advertisement information that is related to the keywords ("car X" and "price") that the user 1 is interested in, and is also related to a dialogue content including the content of the user's question voice 12 and the content of the response voice 12.

Based on the advertisement information being associated with the dialogue content, the electronic apparatus 100 may offer an effect that the advertisement voice may be provided in the dialogue content between the user and the voice assistant without awkwardness caused by disruption of the original conversation.

The configuration and the operation of the electronic apparatus 100 according to the disclosure will be described in more detail with reference to the drawings below.

Figure 2:
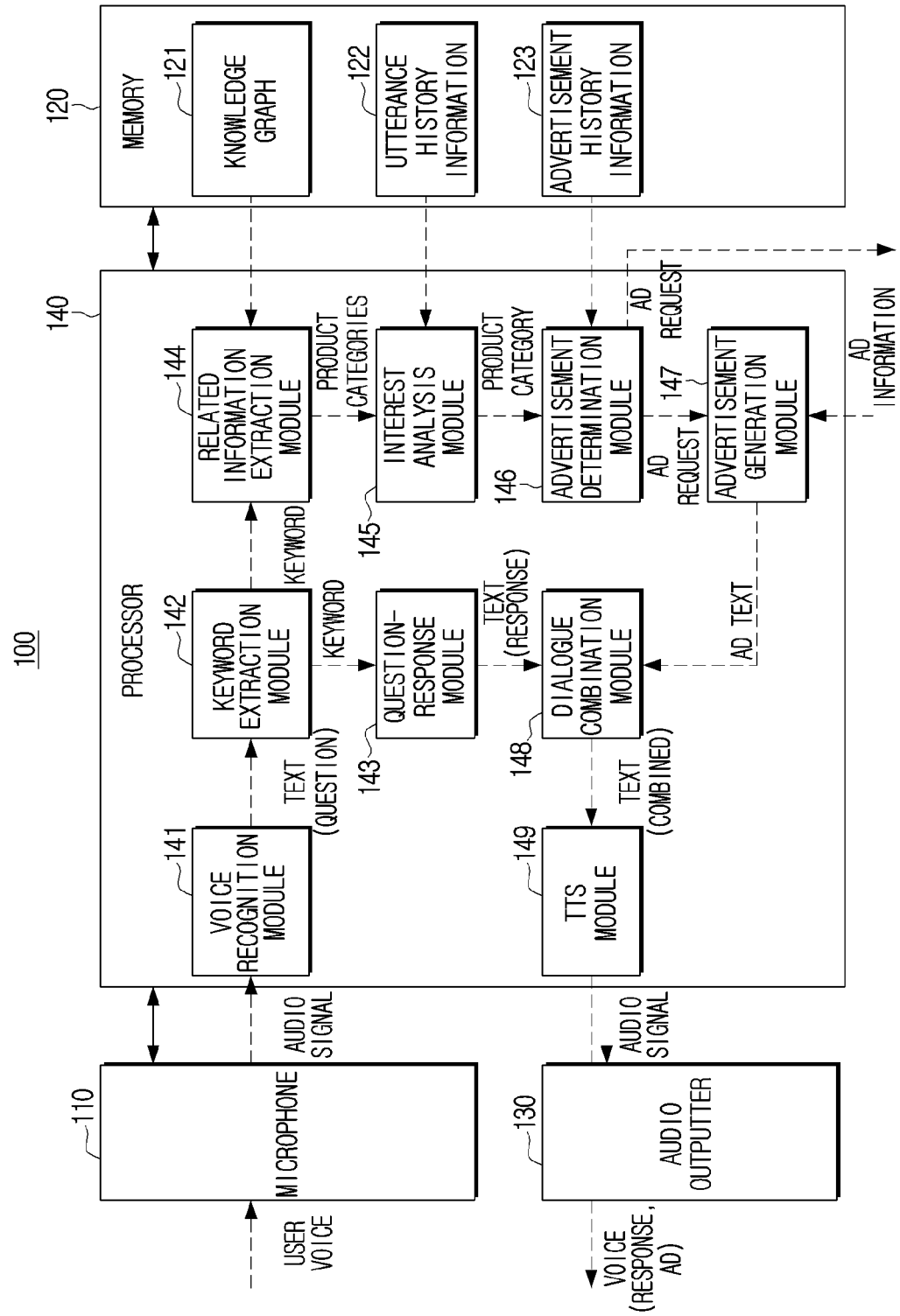
FIG. 2 is a block diagram illustrating a configuration and an operation of the electronic apparatus according to an embodiment.

FIG. 2 is a block diagram illustrating a configuration and an operation of the electronic apparatus 100 according to an embodiment.

Referring to FIG. 2, the electronic apparatus 100 may include a microphone 110, a memory 120, an audio outputter 130, and a processor 140.

The electronic apparatus 100 may correspond to various terminal apparatuses such as a smart speaker, a smartphone, a tablet PC, a notebook PC, and the like. In addition, the electronic apparatus 100 may correspond to various other electronic machines such as a kiosk, a TV, a refrigerator, and the like.

Referring to FIG. 2, the memory 120 may store a knowledge graph 121 including information on a plurality of products and a product category to which each of the plurality of products belongs. The knowledge graph 121 may also include information about a plurality of services and a plurality of service categories corresponding to the plurality of services.

The product herein may refer to one product defined as a product name or the like.

The product (or service) category may refer to a category which is a classification criterion for classifying the products (or services). In this case, each product (or service) category may include one or more products (or services).

In an example, the product category may include a plurality of product categories divided according to types of the products (e.g., car, bicycle, umbrella, and the like). In addition, the product category may include a plurality of product categories divided according to manufacturers, brand names, and the like.

A service category may include a plurality of services categories that are classified according to types of the services (e.g., a ride service, a delivery service, a translation service, and the like).

The plurality of product (or service) categories included in the knowledge graph 121 may be defined in a hierarchical manner according to relationships between higher and lower classes. In other words, at least one product (or service) category included in the knowledge graph 121 may include at least another product (or service) category.

For example, it is assumed that cars 1 and 2 are manufactured by a manufacturer A and cars 3 and 4 are manufactured by a manufacturer B.

In this case, the cars 1 and 2 which are products may belong to the manufacturer A which is a product category, and the cars 3 and 4 which are products may belong to the manufacturer B which is a product category.

In addition, since the cars 1 to 4 have the common characteristic that all of those are cars, the manufacturers A and B which are product categories may belong to the car which is a higher-class product category.

As described above, the memory 120 may store the knowledge graph 121 in which the hierarchical relationship of the plurality of products and the plurality of product categories is defined, and in which the hierarchical relationship of the plurality of services and the plurality of service categories is defined.

In addition, the knowledge graph 121 may further include information on at least one attribute of each of the plurality of products and each of the plurality of services.

The attribute herein may refer to various characteristics of the product (or the service) such as a price, a color, a release date, an expiration date, a production date, a manufacturer, a place of manufacture, a seller, a component, performance, a size, and the like of the product.

The memory 120 may include utterance history information 122 obtained based on a user's voice received through the microphone 110.

The utterance history information 122 herein may include information on a history in which various product (or service) keywords and attribute keywords were uttered by the user in the past (e.g., in the past two weeks).

The product (or service) keyword herein may refer to at least one product (or service) category included in the knowledge graph 121 or at least one product (or service) included in the corresponding product (or service) category.

In addition, the attribute keyword may include a text indicating attributes of a product (or a service) related to a price, a color, a release date, an expiration date, a production date, a manufacturer (or a service provider), a place of manufacture, a seller, a component, performance, a size, and the like of the product (or the service).

For this, when a user's voice is received through the microphone 110, the processor 140 may convert the received user's voice into a text and obtain at least one of the product (or service) keyword and attribute keyword from the text.

In addition, the processor 140 may determine the time when the user's voice is received through the microphone 110, generate the utterance history information 122 by matching information on each keyword at each time, and store the utterance history information 122 in the memory 120. In particular, the processor 140 may store information on a number of times, a frequency, and the like indicating how many times the user uttered each keyword.

An operation of converting the user's voice into the text may be performed by a voice recognition module 141 which will be described below, and an operation of obtaining the keyword from the text may be performed by a keyword extraction module 142 which will be described below.

The memory 120 may include advertisement history information 123 on at least one advertisement provided through the audio outputter 130. The audio outputter 130 may include a speaker, an earphone/headphone output terminal, or the like.

Specifically, the processor 140 may provide at least one advertisement as a voice through the audio outputter 130, and the processor 140 may store information on time, a number of times, a frequency, and the like of that the at least one advertisement is provided through the audio outputter 130 in the memory 120 as the advertisement history information 123.

The advertisement history information 123 may include information on the number of times of the advertisement provided within a certain period of time based on a current time point.

Referring to FIG. 2, the processor 140 may control the voice recognition module 141, the keyword extraction module 142, a question-response module 143, a related information extraction module 144, an interest analysis module 145, an advertisement determination module 146, an advertisement generation module 147, a dialogue combination module 148, a text-to-speech (TTS) module 149, and the like.

The above modules are software stored in the memory 120 and may be controlled by the processor 140. Alternatively, the above modules may be implemented as hardware and may be controlled by the processor 140. Alternatively, the above modules may also be implemented as a combination of software and hardware.

The voice recognition module 141 may convert the user's voice into the text. For this, the voice recognition module 141 may use a noise removal module, an automatic speech recognition (ASR) module, and the like which are well known in the related art.

Referring to FIG. 2, when the user's voice is input through the microphone 110, the user's voice may be converted into an electric signal to obtain an audio signal. The voice recognition module 141 may convert the audio signal obtained through the microphone 110 into the text.

The keyword extraction module 142 may extract at least one keyword from the converted text.

The keyword may include a product keyword referring to at least one product or product category, and an attribute keyword indicating at least one characteristic/attribute of the product. As another example, the keyword may include a service keyword referring to at least one service or service category, and an attribute keyword indicating at least one characteristic or attribute of the service.

In an example, referring to FIG. 1, when the user's voice "Tell me the price of car X" is input, the keyword extraction module 142 may extract "car X" which is the product keyword and "price" which is the attribute keyword.

The keyword extraction module 142 may use a natural language understanding module for understanding the meaning of the converted text. The natural language understanding module may convert the text into machine language and identify the meaning of at least one word/sentence included in the text.

In an example, the keyword extraction module 142 may divide the text into one or more meaning units (e.g., word, morpheme, postpositional particle, symbol, and the like) by using the natural language understanding module.

Among the at least one word included in the at least one divided meaning unit, the keyword extraction module 142 may extract a word matching or corresponding to at least one product, product category, or at least one attribute included in the knowledge graph 121 as a keyword (product keyword or attribute keyword).

The question-response module 143 may provide a response to a user's question.

In an example, when it is identified by the natural language understanding module described above that the text corresponding to the user's voice corresponds to a question, the question-response module 143 may obtain a response text configuring a response to the question.

The question-response module 143 may obtain a response text by using various question-response algorithms used in the related art.

In an example, it is assumed that the text corresponding to the user's voice corresponds to a question text "How much is the car X?"

In this case, the question-response module 143 may search for information on at least one keyword ("car X" and "price") extracted by the keyword extraction module 142.

The question-response module 143 may search for the extracted keyword by using a database.

The database may be a search engine of the related art or a database of the search engine for searching for various keywords. The database may be stored in the memory 120 of the electronic apparatus 100 or stored in at least one external apparatus capable of communicating with the electronic apparatus 100.

The question-response module 143 may obtain at least one response text (e.g., "The price of car X is XXXX won") by using the information obtained through the above search. In this case, at least one artificial intelligence model trained to configure a sentence or at least one sentence template for configuring a response text may be used.

The processor 140 may convert the response text obtained through the question-response module 143 into an audio signal (voice) through the TTS Module 149 which will be described below.

The processor 140 may control the audio outputter 130 to output a voice corresponding to the converted audio signal.

As described above, the response text obtained by the question-response module 143 and the output voice matching or corresponding to the response text may be defined to be included in the voice assistant service provided by the electronic apparatus 100.

The related information extraction module 144 may extract information (product or service category, attribute, or the like) related to the keyword (product or service keyword or attribute keyword) extracted by the keyword extraction module 142.

Specifically, when the product keyword of "car X" is extracted, the related information extraction module 144 may identify at least one product category related to the product keyword (car X) in the knowledge graph 121.

Hereinafter, an example in which the related information extraction module 144 identifies at least one product category related to the product keyword will be described with reference to FIG. 3.

Figure 3:
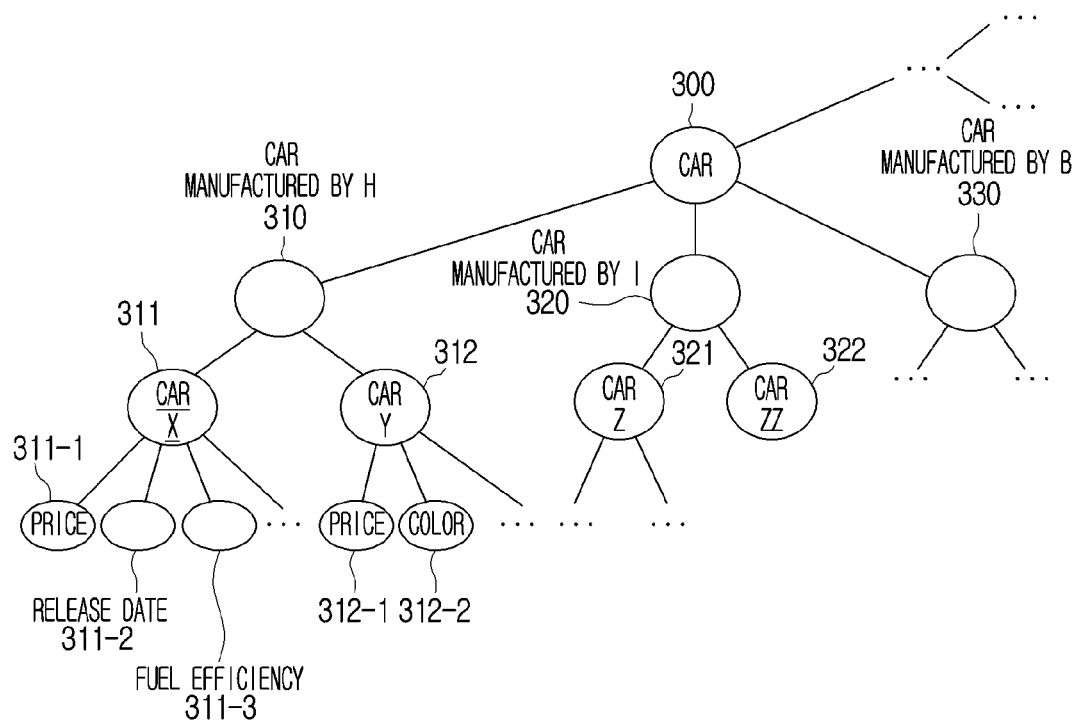
FIG. 3 is a diagram illustrating a configuration of a knowledge graph according to an embodiment.

FIG. 3 illustrates an example of a part of the knowledge graph according to an embodiment of the disclosure.

Referring to FIG. 3, in a knowledge graph 121-1, a plurality of product categories (e.g., car, car manufactured by H, car manufactured by I, and car manufactured by B) and a plurality of products (car X, car Y, car Z, and car ZZ) may match each of a plurality of nodes 300, 310, 320, 330, 311, 312, 321, and 322.

In the knowledge graph 121-1, direct or indirect connections between the nodes may be defined according to hierarchical relationships of higher and lower classes of the plurality of product categories and the plurality of products.

Referring to the knowledge graph 121-1 of FIG. 3, the nodes 311 and 312 of "car X" and "car Y" belonging to "car manufactured by H" which is the product category are directly connected to the node of "car manufactured by H" 310 (in lower class concept), and the nodes 310 and 320 of "car manufactured by H" and "car manufactured by I" belonging to "car" which is the product category are directly connected to the node 300 of "car" (in lower class concept).

Herein, the nodes 310, 320, and 330 corresponding to the car manufactured by H, the car manufactured by I, and the car manufactured by B may correspond to the same level. In the same manner, the nodes 311, 312, 321, and 322 corresponding to the car X, the car Y, the car Z, and the car ZZ may correspond to the same level.

According to an embodiment, the related information extraction module 144 may identify at least one product category corresponding to the node connected through a predetermined number or less nodes from the node of the extracted product keyword in the knowledge graph 121-1.

The related information extraction module 144 may identify only the product category having a level difference from the extracted product keyword that is a predetermined level or less.

Specifically, the related information extraction module 144 may identify product categories (car manufactured by H, car, car manufactured by I, and car manufactured by B) of nodes 310, 300, 320, and 330 which are connected through three or less nodes from the node 311 of "car X" which is the extracted product keyword and have a level difference from the node 311 that is two or less levels, in the knowledge graph 121-1 of FIG. 3.

In addition, the related information extraction module 144 may identify at least one attribute related to the plurality of products included in the identified product category by using the knowledge graph 121-1.

Referring to the knowledge graph 121-1 of FIG. 3, the node 311 of the "car X" which is the product may be connected to nodes 311-1, 311-2, and 311-3 indicating attributes of a price, a release data, and fuel efficiency. In addition, the node 312 of the car Y" which is the product may be connected to nodes 132-1 and 312-2 indicating attributes of a price and a color.

The related information extraction module 144 may identify the attributes (price, release date, fuel efficiency, and color) connected to the products (car X, car Y, car Z, and car ZZ) included in the categories identified previously (car manufactured by H, car manufactured by I, and car manufactured by B), among various attributes defined in the knowledge graph 121-1.

The interest analysis module 145 may determine a product (or service) category and/or attribute that the user is interested in.

Specifically, the interest analysis module 145 may obtain an interest level of the user in each of the product (or service) category and/or attribute identified by the related information extraction module 144.

The interest analysis module 145 may determine a high-interest product (or service) category and/or high-interest attribute having the interest level of the user equal to or more than a threshold value. The terms "high-interest product category," "high-interest service category," "high-interest attribute" are also referred to as "target product category," "target service category," and "target attribute," respectively.

The interest analysis module 145 may obtain the interest level of the user in each of one or more product (or service) categories identified by the related information extraction module 144 by using the utterance history information 122 described above.

Specifically, the interest level of the user in one product (or service) category may be calculated by a number of times, a frequency, or the like that the corresponding product (or service) category or at least one product included in the corresponding product (or service) category (or lower-class product category included in the corresponding product category) is uttered during a certain period of time.

In this regard, FIG. 4A is a table showing utterance history of a user who utters product keywords of various product categories that is input through a microphone according to an embodiment.

Utterance history information 122-1 shown in FIG. 4A indicates an utterance history during recent ten days (Jul. 2, 2020 to Jul. 11, 2020) related to the product categories (car manufactured by H, car manufactured by I, car manufactured by B, and car) identified by the related information extraction module 144 previously.

Referring to FIG. 4A, during recent ten days, the number of times that the product keyword related to the product category "car manufactured by H" is 1, the number of times that the product keyword related to the product category "car manufactured by I" is 3, the number of times that the product keyword related to the product category "car manufactured by B" is 0, and the number of times that the product keyword related to the product category "car" is 9.

The interest analysis module 145 may calculate the interest level of the user by multiplying the number of times of utterance by a predetermined weight.

The predetermined weight may be set variously according to the number of intermediate nodes through which the node (e.g., a first node) corresponding to the product keyword is connected to the node (e.g., a second node) corresponding to the product category in the knowledge graph 121-1.

In this regard, in the knowledge graph 121-1 of FIG. 3 described above, the car X is directly connected to (included in) the "car manufactured by H" and the "car manufactured by H" is directly connected to (included in) the "car".

Accordingly, referring to FIG. 4A, in regard to the car X uttered on Jul. 11, 2020, the "car manufactured by H" is defined as the product category corresponding to a level 1, and the "car" is defined as the product category corresponding to a level 2. Unlike in FIG. 4A, the utterance history information may also be used for the product category at a level 3 or higher.

In an example, it is assumed that a weight for the product category at the level 1 is determined as 0.1 in advance and a weight for the product category at the level 2 is determined 0.04 in advance.

In this case, referring to FIG. 4B, the interest analysis module 145 may obtain the interest level of the user in the "car manufactured by I" as 0.3 by multiplying the weight 0.1 by 3 (times). In addition, the interest analysis module 145 may obtain the interest level of the user in the "car" as 0.36 by multiplying the weight 0.04 by 9 (times).

In the same manner as described above, the interest analysis module 145 may calculate the interest level of the user in the "car manufactured by H" as 0.1 and the interest level of the user in the "car manufactured by B" as 0.

If a threshold value of the interest level for selecting at least one product category as the high-interest product category is 0.2, the interest analysis module 145 may determine the "car manufactured by I" and the "car" having the interest level of 0.2 or higher as the high-interest product categories.

The interest analysis module 145 may transmit the information on the determined high-interest product (or service) categories to the advertisement determination module 146.

In a case of FIG. 4B described above, the interest level is simply calculated by multiplying the same weight uniformly by the number of times of utterance for each category in recent ten days, but the period of time may be longer or shorter than recent ten days.

An utterance history for each product (or service) category during a period of time before the recent ten days may also be additionally considered, but a lower weight may be applied for each number of times of utterance during an older period of time. In addition, the interest level may be calculated by various methods according to the utterance history for each product (or service) category.

The interest analysis module 145 may identify the history (number of times or frequency) that the attribute keyword related to each of at least one attribute identified by the related information extraction module 144 is uttered with respect to the at least one product (or service) category identified by the related information extraction module 144.

In other words, the interest analysis module 145 may identify history (e.g., "How much is the car X?", "The car X is too expensive. Recommend cheaper one.", "Is there any discount promotion for the car manufactured by H these days?") in which the product keyword included in the at least one identified product category (e.g., car manufactured by I, car manufactured by H, and car) and the attribute keyword indicating the at least one identified attribute (e.g., price, release date, fuel efficiency, color, or the like) are uttered by the user.

In this regard, FIG. 5A is a table showing an utterance history for each attribute of the user who utters various attribute keywords according to an embodiment.

Utterance history information 122-2 of FIG. 5A indicates an utterance history during recent ten days (Jul. 2, 2020 to Jul. 11, 2020) in which the attribute keywords (color, release date, how much, price, discount, and fuel efficiency) for the product keywords (car ZZ, car ZZZ, car T, car P, and car X) included in the product categories (car manufactured by H, car manufactured by I, and car manufactured by B) extracted from the knowledge graph 121-1 of FIG. 3 in advance.

Referring to FIG. 5A, the number of times of utterance of the attribute keyword related to the price is 4, the number of times of utterance of the attribute keyword related to the release date is 3, the number of times of utterance of the attribute keyword related to the fuel efficiency is 1, and the number of times of utterance related to the color is 1.

The interest analysis module 145 may calculate the interest level of the user by multiplying the number of times of utterance by a predetermined weight.

Specifically, referring to FIG. 5B in which it is assumed that a weight for each number of times of utterance is set as 0.1 in advance, the interest analysis module 145 may calculate the interest level of the user for "price" as 0.4, the interest level of the user for "release date" as 0.3, the interest level of the user for "fuel efficiency" as 0.1, and the interest level of the user for "color" as 0.1.

If a threshold value of the interest level for selecting at least one attribute as the high-interest attribute is 0.2, the interest analysis module 145 may determine "price" and "release date" having the interest level of 0.2 or higher as the high-interest attribute.

The high-interest attribute determined as described above may be used when the advertisement generation module 147 which will be described below generates an advertisement text.

The advertisement determination module 146 may determine whether to provide an advertisement related to the user's voice input through the microphone 110 through the audio outputter 130.

In particular, the advertisement determination module 146 may determine whether to provide the advertisement based on the interest level of the user and an advertisement fatigue level of the user with respect to the high-interest product (or service) category determined by the interest analysis module 145.

The advertisement fatigue level may conceptually refer to a fatigue level that the user will feel, if the advertisement is provided at a current time point.

The advertisement determination module 146 may identify the history (number of times, time, frequency, and the like) that the advertisement is provided through the audio outputter 130 during a predetermined period of time by using the advertisement history information 123, and calculate the advertisement fatigue level according to the identified history.

FIG. 6A is a table showing the advertisement history information of the advertisement voice provided through the audio outputter according to an embodiment.

Advertisement history information 123-1 of FIG. 6A indicates a history of advertisements provided through the audio outputter 130 with respect to various advertisement targets during recent ten days (Jul. 2, 2020 to Jul. 11, 2020).

The advertisement determination module 146 may obtain the advertisement fatigue level of the user at the current time point by using the advertisement history information 123-1.

Specifically, the advertisement determination module 146 may set the weight for each number of times of advertisement to 0.05 and may multiply the weight by the number of times of advertisement during recent ten days (6 times). In this case, the advertisement determination module 146 may calculate the advertisement fatigue level of the user as 0.3.

Referring to FIG. 6A described above, the advertisement fatigue level is simply calculated by multiplying the number of times of the advertisements provided during recent ten days by the same weight uniformly, but the advertisement fatigue level may be calculated using various other methods.

For example, the advertisements provided during a period of time before the recent ten days may also be considered, but a lower weight may be applied for each number of times if it is the advertisement provided during an older period of time.

The advertisement determination module 146 may calculate an advertisement concentration level of the user on each high-interest product (or service) category based on the interest level of the user and the advertisement fatigue level of the user with respect to each high-interest product (or service) category.

The advertisement determination module 146 may calculate a value obtained by subtracting the advertisement fatigue level of the user from the interest level of the user for each high-interest product (or service) category as the advertisement concentration level.

For example, the advertisement determination module 146 may calculate the advertisement concentration level of the user on each high-interest product (or service) category by subtracting the advertisement fatigue level (0.3) from each of the interest levels (0.36 and 0.3) of the high-interest product (or service) categories (car and car manufactured by I) determined through the embodiments of FIGS. 4A and 4B.

As a result, referring to FIG. 6B, the advertisement concentration level of the "car" may be calculated as 0.06 and the advertisement concentration level of the "car manufactured by I" may be calculated as 0.

The advertisement determination module 146 may identify whether the advertisement concentration level of the high-interest product (or service) category having the highest calculated advertisement fatigue level is equal to or higher than a predetermined threshold value.

When the corresponding advertisement concentration level is equal to or higher than the predetermined threshold value, the advertisement determination module 146 may determine to provide the advertisement.

In other words, the advertisement determination module 146 may generate an advertisement request for providing the advertisement for the high-interest product (or service) category with the highest advertisement concentration level.

In an example, it is assumed that the threshold value of the advertisement concentration level is 0.0. Referring to FIG. 6B, the advertisement concentration level of the "car" having the highest advertisement concentration level is 0.06 which is higher than 0.0, and accordingly, in this case, the advertisement determination module 146 may generate the advertisement request for the "car".

On the other hand, when the corresponding advertisement concentration level is lower than the predetermined threshold value, the advertisement determination module 146 may not generate the advertisement request. As a result, no advertisement may be provided.

The advertisement determination module 146 may transmit the generated advertisement request to an external server and/or the advertisement generation module 146.

Specifically, the advertisement determination module 146 may transmit the advertisement request for the high-interest product category that is determined to provide the advertisement to an external server and/or the advertisement generation module 147.

The advertisement determination module 146 may transmit information on an attribute (price) matching or corresponding to the attribute keyword (price) extracted by the keyword extraction module 142 in advance and/or information on the high-interest attribute (price and release date) determined by the related information extraction module 144 in advance.

As a result, with respect to at least one product included in the high-interest product category (e.g., car) determined to provide the advertisement, the advertisement information including the information (price and release date) on the extracted attribute keyword and/or the determined high-interest attributes may be obtained.

The advertisement information may contain information for advertising at least one product registered by an advertiser among products included in the high-interest product category which is a target of the advertisement request.

The advertisement information may include information matching or corresponding to various attributes of the registered product.

For example, the advertisement information may be received from an external server which receives the advertisement request from the advertisement determination module 146.

The product to be advertised may be registered in advance with respect to at least one product category by a request or an application of the advertiser.

Specifically, when an advertisement system configured with one or more servers, one or more advertiser apparatuses, and one or more user apparatuses (e.g., electronic apparatus 100) is constructed, an advertisement contract of at least one product may be made for each product category.

For this, the advertiser may request for the advertisement for at least one product with respect to at least one product category. When the advertisement request received from the electronic apparatus 100 is for the corresponding product category, the advertisement information on the product requested by the advertiser may be provided to the electronic apparatus 100 through the server.

The request of the advertiser to advertise at least one product may be performed by a real time bidding method.

In an example, when the advertisement determination module 146 transmits, to the server, the advertisement request for the high-interest product category determined to provide the advertisement through the audio outputter 130, the server may transmit information on the corresponding high-interest product category to advertiser apparatuses.

In this case, the advertiser apparatuses may participate in the real time auction for the advertisement to be provided through the audio outputter 130 of the electronic apparatus 100.

Specifically, each advertiser apparatus may transmit the advertisement information on at least one product included in the high-interest product category that is the target of the advertisement request among the products of each advertiser to the server, and transmit information on a bidding price to win the bidding for the advertisement to the server.

As a result, the product (e.g., car Z) of one advertiser (e.g., company H) that has transmitted information on the highest bidding price during the time of the auction (e.g., 100 ms or 200 ms) may be selected as the target of the advertisement.

The server may transmit the advertisement information of the corresponding product (car Z) to the electronic apparatus 100.

The advertisement information may also be stored in the memory 120 of the electronic apparatus 100 in advance. In this case, when the advertisement request is received from the advertisement determination module 146, the advertisement generation module 147 may obtain the advertisement information of the high-interest product category corresponding to the advertisement request among the pieces of advertisement information stored in the memory 120 in advance.

The advertisement generation module 147 may be a constituent element for generating an advertisement text by using the obtained advertisement information, when it is determined to provide the advertisement by the advertisement determination module 146.

In an example, when the "car" is the high-interest product category which is the target of the advertisement request, the advertisement generation module 147 may generate the advertisement text including the advertisement information on at least one product (e.g., car Z) included in the "car".

In this case, the advertisement generation module 147 may generate the advertisement text based on the attribute keyword (e.g., price) extracted from the user's voice (Tell me the price of car X) by the keyword extraction module 142 previously.

In other words, the advertisement generation module 147 may identify an attribute matching an attribute keyword uttered by the user at the current time point as the high-interest attribute, and generate the advertisement text based on the high-interest attribute.

In this case, even if the advertisement information includes information on a plurality of attributes (price, release date, color, fuel efficiency, and the like) of the car Z, the advertisement generation module 147 may generate the advertisement text by extracting the information on the "price" attribute among the pieces of the obtained advertisement information of the car Z.

In addition, the advertisement generation module 147 may generate the advertisement text by using the high-interest attribute determined by the interest analysis module 145 in advance.

In an example, referring to FIG. 5B described above, when the high-interest attributes determined by the interest analysis module 145 are "price" and "release date", the advertisement generation module 147 may generate the advertisement text by extracting the information on the "price" and the "release date" among the obtained advertisement information.

Accordingly, the advertisement text including only the information on the price and the release date of the car Z (e.g., The price of 2020 new car Z is fifty million won) may be generated.

The dialogue combination module 148 may obtain a combined text by combining the response text obtained through the question-response module 143 with the advertisement text generated through the advertisement generation module 147.

In this case, the dialogue combination module 148 may change at least a part of the advertisement text according to a context of the response text. The dialogue combination module 148 may form the combined text so that the response text is followed by the changed advertisement text.

The dialogue combination module 148 may also obtain the combined text by inputting the response text and the changed advertisement text to a sentence combination model trained to combine one or more sentences or phrases.

In an example, it is assumed that the response text is "The price of the car X is sixty million won" and the advertisement text is "The price of 2020 new car Z is fifty million won".

In this case, the dialogue combination module 148 may obtain the combined text "The price of the car X is sixty million won. By the way, the price of 2020 new car Z is fifty million won. Do you want more information about the car Z?"

The text-to-speech (TTS) module 149 may be a module for converting at least one text into an audio signal. The TTS module 149 may generate the audio signal by converting the advertisement text or the combined text.

In an example, the TTS module 149 may divide the combined text in a syllable unit, obtain an audio signal mapping to each divided syllable, and combine the obtained audio signals. However, various other well-known technologies in the related art may be used and there is no limitation.

The processor 140 may control the audio outputter 130 to output the voice according to the audio signal converted from the combined text. As a result, it is possible to provide the response to the user's question and the advertisement together in a form of voice.

Specifically, after outputting the response voice to the user's question (The price of the car X is sixty million won.) through the audio outputter 130, the advertisement voice (By the way, the price of 2020 new car Z is fifty million won. Do you want more information about the car Z?) may be output through the audio outputter 130.

However, if the user's voice described above is not a question, only the advertisement text may be input to the TTS module 149. In this case, the voice output through the audio outputter 130 may include only the advertisement.

Referring to FIG. 2 described above, only the case where the electronic apparatus 100 includes the microphone 110 and the audio outputter 130 is described, but the electronic apparatus 100 may also perform the operations described above by communicating with at least one external apparatus including a microphone and/or an audio outputter. In this case, the electronic apparatus 100 may be implemented as a server, a set-top box, a console, or the like.

The interest level for each product category determined by the interest analysis module 145 may be additionally updated according to the relevance level between the keyword included in the user's voice and each product category, and in this case, the criteria for selecting the high-interest product category may be slightly different from the embodiment of FIG. 4B described above.

The relevance level between the keyword and each product category may be defined according to the knowledge graph, and therefore it will be described below with reference to a knowledge graph of FIG. 7A.

Figure 7A:
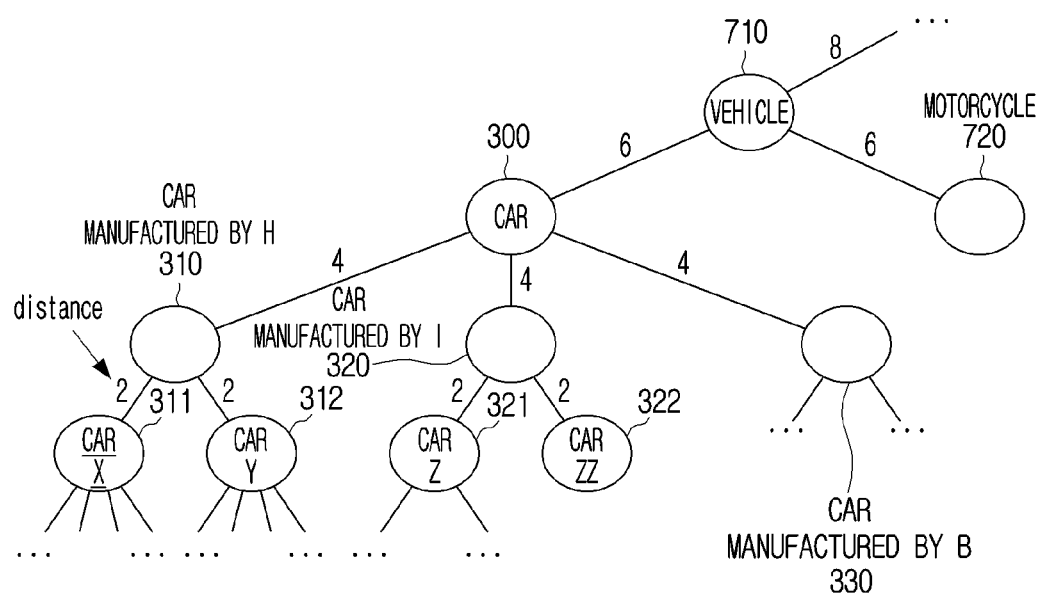
FIG. 7A is a diagram illustrating a configuration of a knowledge graph according to an embodiment.

Referring to FIG. 7A, a knowledge graph 121-2 may additionally include information on a distance between nodes.

The distance herein may be understood with a concept that is inverse proportional to the relevance level between nodes.

Referring to FIG. 7A, a distance between the node 311 of the car X which is the product keyword included in the currently input user's voice and the node 310 of the car manufactured by H is 2, and a distance between the node 310 of the car manufactured by H and the node 300 of the car is 4. The distance between the node 311 and the node 300 is 6 (2+4).

In an example, the relevance level between the keyword and each product category may be defined as an inverse number.

In this case, referring to FIGS. 7A and 7B, since the distance between the node 311 and the node 310 is 2, the relevance level between the "car X" and the "car manufactured by H" is 0.5.

In addition, since the distance between the node 311 and the node 300 is 6, the relevance level between the "car X" and the "car" is 0.167.

Further, since the distance between the node 311 and the node 320 is 10, the relevance level between the "car X" and the "car manufactured by I" is 0.167.

Furthermore, since the distance between the node 311 and the node 330 is 10, the relevance level between the "car X" and the "car manufactured by B" is 0.167.

The interest analysis module 145 may update the interest level for each product category by adding the relevance level to each interest level for each product category calculated in FIG. 4B.

As a result, referring to FIG. 8, the interest level for each product category may be updated. Specifically, the interest level of the user in the "car" may be updated to 0.527, the interest level of the user in the "car manufactured by I" may be updated to 0.4, the interest level of the user in the "car manufactured by H" may be updated to 0.6, and the interest level of the user in the "car manufactured by B" may be updated to 0.1.

If a threshold value of the interest level for selecting as the high-interest produce category is 0.5, the interest analysis module 145 may identify the "car" and "car manufactured by H" having the interest level of 0.5 or higher as the high-interest product categories.

As described above, the relevance level is additionally considered to calculate the interest level for each product category, and accordingly, the identified high-interest product category may be different from the embodiment of FIG. 4B (the car and the car manufactured by I are identified as the high-interest product categories).

In this case, the advertisement determination module 146 may calculate the advertisement concentration level of each high-interest product category by subtracting the advertisement fatigue level (0.3, see FIG. 6A) from the interest level of each of the high-interest product categories (car manufactured by H and car) calculated in FIG. 8.

As a result, referring to FIG. 9, the advertisement determination module 146 may select the "car manufactured by H" having the highest advertisement concentration level that is higher than the threshold value (e.g., 0.0) as the product category of the advertisement target. As a result, the advertisement voice for the "car manufactured by H" may be output through the audio outputter 140.

Figure 10:
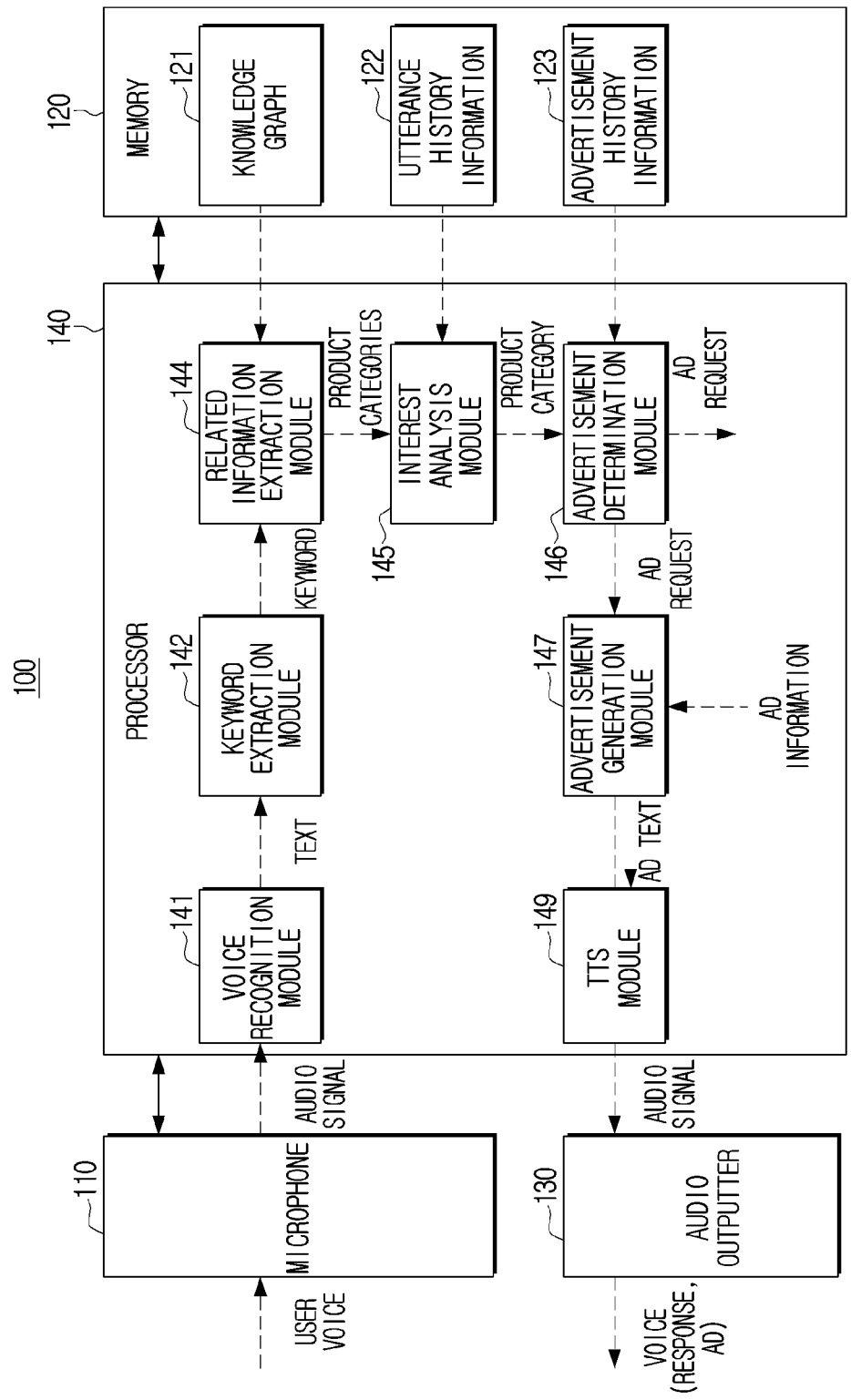
FIG. 10 is a block diagram illustrating a configuration and an operation of the electronic apparatus according to an embodiment.

FIG. 10 is a block diagram illustrating a configuration and an operation of the electronic apparatus according to an embodiment.

Referring to FIG. 10, unlike in FIG. 2, the electronic apparatus 100 may not include the response-question module 143 and the dialogue combination module 148.

In this case, the electronic apparatus 100 may not provide the response to the user's question, but may determine whether to provide the advertisement by using the keywords (product keyword, attribute keyword) included in the user's voice for using at least one service (e.g., search, shopping, and the like) provided by the electronic apparatus 100 and the user's utterance history (e.g., user's voice command history).

When it is determined to provide the advertisement, in the same manner as in the embodiments described above, the electronic apparatus 100 may identify at least one product category according to a keyword included in a user's voice command, and provide an advertisement voice related to the determined product category.

Figure 11:
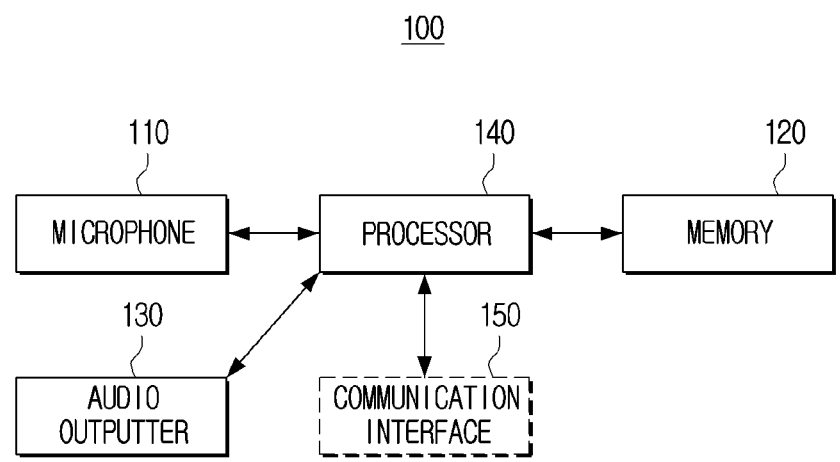
FIG. 11 is a block diagram illustrating a configuration of the electronic apparatus according to an embodiment.

FIG. 11 is a block diagram illustrating a configuration of the electronic apparatus according to an embodiment.

Referring to FIG. 11, the electronic apparatus 100 may include the microphone 110, the memory 120, the audio outputter 130, the processor 140, and a communication interface 150.

The microphone 120 is a constituent element for receiving a user's voice and converting the user's voice into an electric audio signal and may include at least one circuit.

The memory 120 may store an operating system (OS) for controlling general operations of constituent elements of the electronic apparatus 100 and at least one instruction or data related to the constituent elements of the electronic apparatus 100.

The memory 120 may include a non-volatile memory such as a ROM, a flash memory, or the like and may include a volatile memory such as a DRAM. In addition, the memory 120 may also include a hard disk drive, a solid state drive (SSD), and the like.

The memory 120 may include data for an acoustic model, a language model, and the like used by the voice recognition module 141, and may include a natural language understanding model and the like used by the keyword extraction module 142.

In addition, the memory 120 may include various artificial intelligence models for providing the services of the voice assistant.

The audio outputter 130 is a constituent element for outputting the response voice of the electronic apparatus 100 to the user's question and/or the advertisement voice in a form of voice. The audio outputter 130 may include a speaker, an earphone/headphone output terminal, or the like.

The processor 140 may control general operations of the electronic apparatus 100. Specifically, the processor 140 may be connected to the memory 120 to control the electronic apparatus 100.

For this, the processor 140 may include a central processing unit (CPU), a graphic processing unit (GPU), a neural processing unit (NPU), and the like in terms of hardware, and may perform operation or data processing for controlling other constituent elements included in the electronic apparatus 100.

The processor 140 may be implemented as a micro processing unit (MPU) or may correspond to a computer connected to a random access memory (RAM), a read only memory (ROM), and the like via a system bus.

The processor 140 may control, not only the hardware constituent elements included in the electronic apparatus 100, but also one or more software modules included in the electronic apparatus 100, and the result of controlling of the software modules by the processor 140 may be derived as operations of hardware constituent elements.

The processor 140 may be formed of one or a plurality of processors. The one or the plurality of processors may be a general-purpose processor such as a CPU, an accelerated processing unit (APU), or the like, a graphic dedicated processor such as a GPU, a vision processing unit (VPU), or the like, or an artificial intelligence (AI) dedicated processor such as an NPU, an AI accelerator, a machine learning accelerator, or the like.

The one or the plurality of processors may perform control to process the input data according to a predefined action rule stored in the non-volatile memory and the volatile memory or an artificial intelligence model. The predefined action rule or the artificial intelligence model is formed through training.

Being formed through training herein may, for example, imply that a predefined action rule or an artificial intelligence model for a desired feature is formed by applying a learning algorithm to a plurality of pieces of training data. Such training may be performed in an apparatus demonstrating artificial intelligence according to the disclosure or performed by a separate server/system.

The learning algorithm may be a method for training a predetermined target machine (e.g., robot) by using a plurality of pieces of training data to allow the predetermined target machine to determine or predict by itself. Examples of the learning algorithm include supervised learning, unsupervised learning, semi-supervised learning, or reinforcement learning, but the learning algorithm of the disclosure is not limited to the above examples, unless otherwise noted.

The communication interface 150 may be a constituent element for communicating with one or more external electronic apparatuses and may include circuitry.

The communication interface 150 may transmit and receive various pieces of information with one or more external electronic apparatuses using communication rule (protocol) such as Transmission Control Protocol/Internet Protocol (TCP/IP), User Datagram Protocol (UDP), Hyper Text Transfer Protocol (HTTP), Secure Hyper Text Transfer Protocol (HTTPS), File Transfer Protocol (FTP), Secure File Transfer Protocol (SFTP), Message Queuing Telemetry Transport (MQTT), or the like.

For this, the communication interface 150 may be connected to the external electronic apparatus based on a network implemented through wired communication and/or wireless communication. The communication interface 150 may be connected directly to the external electronic apparatus and may also be connected to the external electronic apparatus through one or more external server (e.g., internet service provider (ISP) for providing a network.

The network may be a personal area network (PAN), a local area network (LAN), or a wide area network (WAN) according to an area or scale, and may also be an intranet, an extranet, or the Internet according to openness of the network.

The wireless communication may include at least one of communication methods such as long-term evolution (LTE), LTE Advance (LTE-A), 5th Generation (5G) mobile communication, code division multiple access (CDMA), wideband CDMA (WCDMA), universal mobile telecommunications system (UMTS), Wireless Broadband (WiBro), Global System for Mobile Communications (GSM), Time Division Multiple Access (DMA), Wi-Fi, Wi-Fi Direct, Bluetooth, near field communication (NFC), Zigbee, and the like.

The wired communication may include at least one of communication methods such as Ethernet, an optical network, a universal serial bus (USB), ThunderBolt, and the like. The communication interface 150 may include a network interface or a network chip according to the wired or wireless communication methods described above. The communication method is not limited to the above examples and may also include a communication method newly appearing along with the development of technology.

For example, when it is determined to provide the advertisement by the advertisement determination module 146, the processor 140 may transmit the information on the product category, for which the advertisement is to be provided, to the server through the communication interface 150.

When the advertisement information is received from the server through the communication interface 150, the processor 140 may provide at least a part of the received advertisement information in a form of voice through the audio outputter 130.

The knowledge graph 121 may be stored in the server rather than the electronic apparatus 100. In this case, the processor 140 may receive and use at least a part of the knowledge graph 121 from the server via the communication interface 150.

The utterance history information 122 may further include information on the utterance history of the user input through other electronic apparatuses of the user, in addition to the utterance history of the user input through the microphone 110 of the electronic apparatus 100.

The information on the utterance history of the user input through the other electronic apparatuses described above may be received via the communication interface 150.

In the same manner as described above, the advertisement history information 123 may also include the history of the advertisement voice provided through the other electronic apparatuses, in addition to the history of the advertisement voice provided through the audio outputter 130 of the electronic apparatus 100.

The information on the history of the advertisement voice provided through the other electronic apparatuses described above may be received through the communication interface 150.

At least one of the modules 141, 142, 143, 144, 145, 146, 147, 148, and 149 described above may be included in an external server.

In this case, the processor 140 may communicate with the corresponding server through the communication interface 150 and the operations of the modules may be performed through a system including the electronic apparatus 100 and the server.

Hereinafter, a method for controlling the electronic apparatus according to the disclosure will be described with reference to FIGS. 12 to 14.

Figure 12:
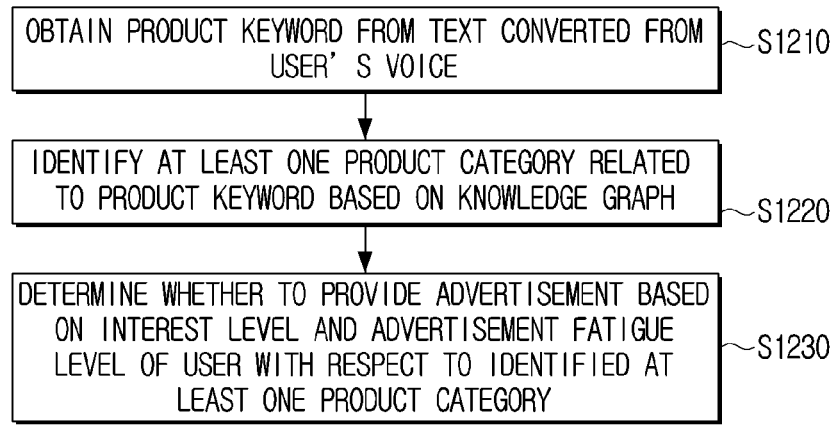
FIG. 12 is a flowchart illustrating a method for controlling the electronic apparatus according to an embodiment.

FIG. 12 is a flowchart illustrating a method for controlling the electronic apparatus according to an embodiment. The memory of the electronic apparatus may include a knowledge graph including information on a plurality of product categories corresponding to a plurality of products, utterance history information obtained based on a user's voice received through the microphone, and advertisement history information on the advertisement provided through the audio outputter.

Referring to FIG. 12, in the control method, at least one product keyword may be identified from a text converted from a user's voice input through a microphone (operation S1210).

At least one product category related to the product keyword may be identified based on the knowledge graph (operation S1220).

Specifically, in the knowledge graph, the product category corresponding to at least one node close to a node of the product keyword may be identified.

The control method may include determining whether to provide an advertisement related to the user's voice based on an interest level of the user in the identified product category and an advertisement fatigue level of the user obtained according to advertisement history information (operation S1230).

A number of times that the user utters the identified product category during a predetermined period of time may be identified based on the utterance history information, and the interest level of the user in each identified product category may be identified based on the identified number of times.

A number of times that the advertisement is provided through the audio outputter during the predetermined period of time may be identified based on the advertisement history information, and the advertisement fatigue level of the user may be identified based on the identified number of times.

An advertisement concentration level of the user on each of the identified product categories may be identified based on the interest level of the user and the advertisement fatigue level of the user.

A high-interest product category having a highest advertisement concentration level among the identified product categories may be identified.

When the advertisement concentration level of the identified high-interest product category is equal to or higher than a predetermined threshold value, it may be determined to provide the advertisement.

Specifically, the advertisement information may be obtained based on the identified high-interest product category, and the advertisement voice may be output through the audio outputter based on the advertisement information.

The advertisement information may be stored in the electronic apparatus in advance and may be received from the server.

In an example, by transmitting the advertisement request including the information on the high-interest product category to the server, the advertisement information received from the server may be received.

As a result, the received advertisement information may be provided as an advertisement voice.

When the input user's voice corresponds to a question, the control method may include outputting an advertisement voice after outputting a response voice.

The knowledge graph may include information on a plurality of attributes corresponding to the plurality of products.

In this case, the control method may include obtaining an attribute keyword related to the product keyword from a text converted from the input user's voice.

In the knowledge graph, a first high-interest attribute may be selected by identifying the attribute matching the attribute keyword.

In the knowledge graph, at least one attribute belonging to each of the product categories identified through the product keyword may be identified. According to the utterance history information, at least one attribute among the identified attributes may be identified as a second high-interest attribute.

Specifically, based on the utterance history information, a number of times that the user utters an attribute keyword of each of at least one identified attribute during a predetermined period of time may be identified. The number of times that the user utters the corresponding attribute keyword for the identified product category may be identified.

Based on the identified number of times, an interest level of the user in each of at least one identified attribute may be identified. At least one attribute having the interest level equal to or higher than a predetermined threshold value may be identified as the second high-interest attribute.

Among the advertisement information obtained as described above, advertisement information matching the first high-interest attribute and/or second high-interest attribute may be output as an advertisement voice.

Figure 13:
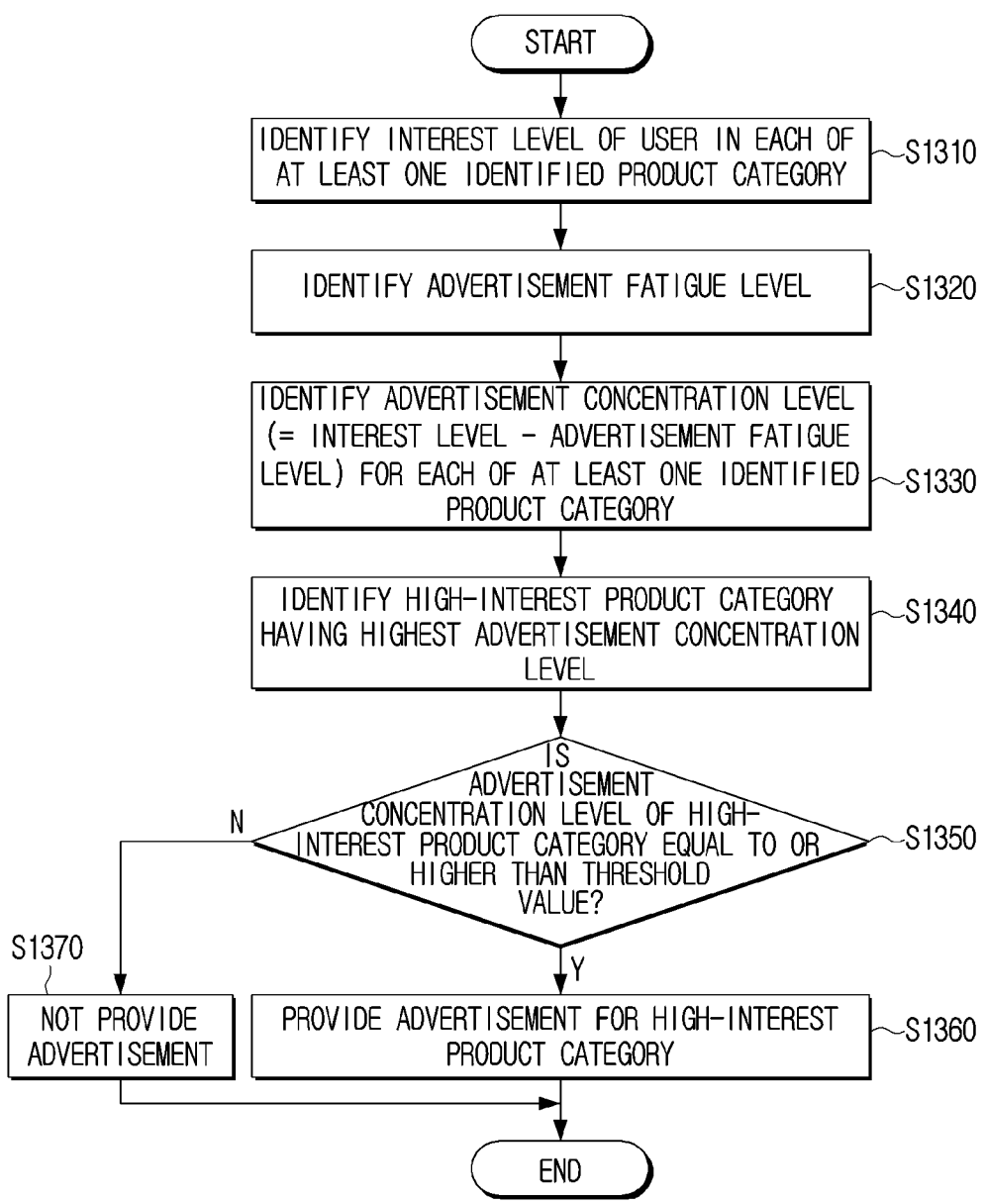
FIG. 13 is an algorithm illustrating an operation of determining whether to provide an advertisement in the method for controlling the electronic apparatus according to an embodiment.

FIG. 13 is an algorithm illustrating an operation of determining whether to provide an advertisement in the method for controlling the electronic apparatus according to an embodiment.

Referring to FIG. 13, in the control method, the interest level of the user in each of the at least one extracted product category may be identified through the product keyword extracted from the user's voice (operation S1310).

An advertisement fatigue level of the user may be identified according to advertisement history information in which the advertisement voice is provided through the audio outputter during a predetermined recent period of time (operation S1320).

The advertisement concentration level (=interest level−advertisement fatigue level) may be identified for each product category identified in S1310 operation (S1330).

A high-interest product category having a highest advertisement concentration level may be identified (operation S1340).

When the advertisement concentration level of the high-interest product category is equal to or higher than a threshold value (operation S1350-Y), the advertisement for the high-interest product category may be provided as a voice through the audio outputter (operation S1360).

On the other hand, when the advertisement concentration level of the high-interest product category is lower than the threshold value (operation S1350-N), the advertisement may not be provided (operation S1370).

Figure 14:
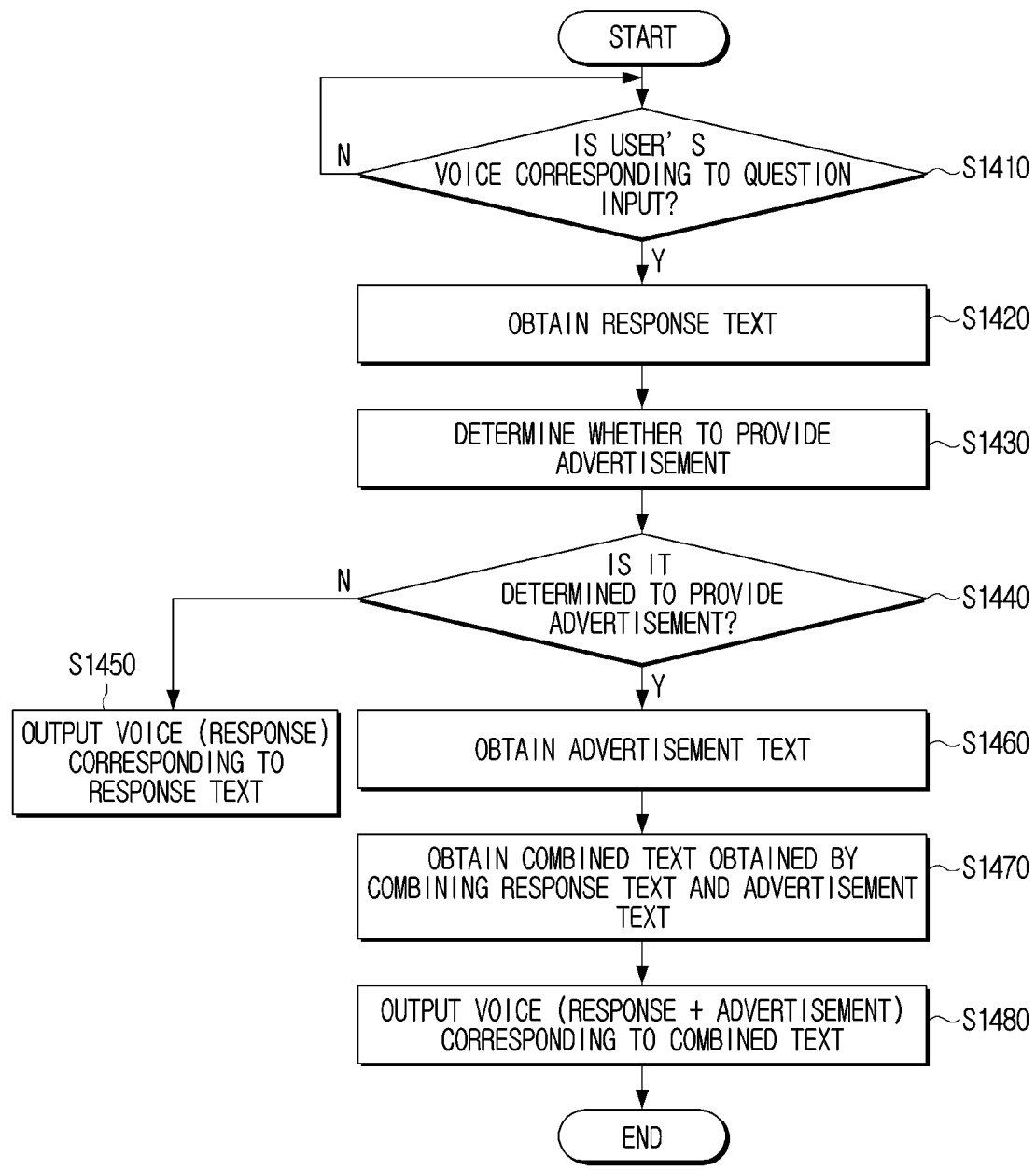
FIG. 14 is an algorithm illustrating an operation flow of the electronic apparatus according to an embodiment.

FIG. 14 is an algorithm illustrating a general operation flow of the electronic apparatus according to an embodiment.

Referring to FIG. 14, in the control method, when the user's voice is input through the microphone, it may be determined whether the user's voice corresponds to a question (operation S1410).

When the user's voice corresponds to the question (operation S1410-Y), a response text to the question may be obtained (operation S1420).

Then, it may be determined whether to provide an advertisement with the response (operation S1430).

Specifically, the product categories related to the product keyword included in the user's voice may be identified, and it may be identified whether the advertisement concentration level of the product category having the highest advertisement concentration level among the product categories is equal to or higher than a threshold value.

When it is equal to or higher than the threshold value, it may be determined to provide the advertisement for the corresponding product category. On the other hand, when it is lower than the threshold value, it may be determined to not provide the advertisement.

When it is determined to not provide the advertisement (operation S1440-N), only a voice corresponding to the response text may be output (operation S1450).

On the other hand, when it is determined to provide the advertisement (operation S1440-Y), advertisement information on the product category having the highest advertisement concentration level may be obtained, thereby obtaining an advertisement text (operation S1460).

Next, a combined text obtained by combining the response text and the advertisement text may be obtained (operation S1470), and a voice (response+advertisement) corresponding to the combined text may be output (operation S1480).

The method for controlling the electronic apparatus described with reference to FIGS. 12 to 14 may be performed through the electronic apparatus 100 illustrated and described with reference to FIGS. 2 and 11.

The method for controlling the electronic apparatus described with reference to FIGS. 12 to 14 may be performed through a system including the electronic apparatus 100 and at least one external apparatus.

The embodiments described above may be implemented in a recording medium readable by a computer or a similar apparatus using software, hardware, or a combination thereof.

According to the implementation in terms of hardware, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

In some cases, the embodiments described in the specification may be implemented as the processor itself. According to the implementation in terms of software, the embodiments such as procedures and functions described in this specification may be implemented as separate software modules. Each of the software modules may perform one or more functions and operations described in this specification.

Computer instructions for executing processing operations in the electronic apparatus 100 according to the embodiments of the disclosure descried above may be stored in a non-transitory computer-readable medium. When the computer instructions stored in such a non-transitory computer-readable medium are executed by a processor of a specific machine, the computer instructions may enable the specific machine to execute the processing operations in the electronic apparatus 100 according to the embodiments described above.

The non-transitory computer-readable medium is not a medium storing data for a short period of time such as a register, a cache, or a memory, but may refer to a medium that semi-permanently stores data and is readable by a machine. Specifically, the various applications or programs described above may be stored and provided in the non-transitory computer-readable medium such as a CD, a DVD, a hard disk drive, a Blu-ray disc, a USB, a memory card, and a ROM.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus comprising:
a microphone;
a speaker;
a memory storing a knowledge graph comprising information on a plurality of product categories corresponding to a plurality of products, utterance history information obtained based on a user voice that is input through the microphone, and advertisement history information on a past advertisement provided through the speaker; and
a processor connected to the microphone, the speaker, and the memory,
wherein the processor is configured to:
obtain at least one product keyword from a text converted from the user voice that is input through the microphone;
identify one or more product categories related to the at least one product keyword, from among the plurality of product categories, based on the knowledge graph;
determine whether to provide an advertisement related to the user voice based on an interest level of a user in the identified one or more product categories that is obtained according to the utterance history information and an advertisement fatigue level of the user obtained according to the advertisement history information; and
based on a determination to provide the advertisement, obtain advertisement information based on a target product category identified according to the interest level of the user from among the identified one or more product categories, and
control the speaker to output an advertisement voice based on the advertisement information,
wherein the plurality of product categories included in the knowledge graph are configured in a hierarchical structure,
wherein the processor is further configured to identify the interest level of the user in the plurality of product categories using weights set differently according to levels of the plurality of product categories, and
wherein a weight assigned to a high level-product category is set lower than a weight assigned to a low level-product category.

2. The electronic apparatus according to claim 1, further comprising:
a communication interface,
wherein the processor is further configured to, based on the determination to provide the advertisement, transmit an advertisement request including information on the target product category to a server via the communication interface, and receive the advertisement information from the server via the communication interface.

3. The electronic apparatus according to claim 1, wherein the processor is further configured to:
identify a number of times that the user utters the identified one or more product categories during a first predetermined period of time based on the utterance history information, and identify the interest level of the user in each of the identified one or more product categories based on the identified number of times;
identify a number of times that the past advertisement is provided via the speaker during a second predetermined period of time based on the advertisement history information; and
identify the advertisement fatigue level of the user based on the identified number of times.

4. The electronic apparatus according to claim 1, wherein the processor is further configured to:
identify an advertisement concentration level of the user on each of the identified one or more product categories based on the interest level of the user and the advertisement fatigue level of the user;
identify the target product category having a highest advertisement concentration level from among the identified one or more product categories; and
based on the advertisement concentration level of the target product category being equal to or higher than a predetermined threshold value, determine to provide the advertisement.

5. The electronic apparatus according to claim 1, wherein the knowledge graph comprises information on a plurality of attributes corresponding to the plurality of products, and
wherein the processor is further configured to:
obtain an attribute keyword related to the at least one product keyword from the text;
identify a target attribute related to the attribute keyword from among the plurality of attributes included in the knowledge graph; and
control the speaker to output the advertisement voice based on the advertisement information corresponding to the identified target attribute.

6. The electronic apparatus according to claim 1, wherein the knowledge graph comprises information on a plurality of attributes corresponding to the plurality of products, and
wherein the processor is further configured to:
identify one or more attributes for at least one product belonging to the identified one or more product categories based on the knowledge graph;
identify at least one attribute, from among the one or more identified attributes, as a target attribute based on the utterance history information; and
control the speaker to output the advertisement voice based on the advertisement information corresponding to the identified target attribute.

7. The electronic apparatus according to claim 6, wherein the processor is further configured to:
identify a number of times that the user utters an attribute keyword for each of the one or more identified attributes with respect to the identified one or more product categories during a predetermined period of time based on the utterance history information;
identify the interest level of the user in each of the one or more identified attributes based on the identified number of times; and
identify an attribute having the identified interest level equal to or higher than a predetermined threshold value, from among the one or more identified attributes, as the target attribute.

8. The electronic apparatus according to claim 1, wherein the processor is configured to:
output a response voice for the user voice via the speaker; and based on the determination to provide the advertisement, control the speaker to output the advertisement voice after outputting the response voice.

9. A method for controlling an electronic apparatus comprising a memory storing a knowledge graph comprising information on a plurality of product categories corresponding to a plurality of products, utterance history information obtained based on a user voice that is through a microphone, and advertisement history information on a past advertisement provided through a speaker, the method comprising:
   obtaining at least one product keyword from a text converted from the user voice that is input through the microphone;
   identifying one or more product categories related to the at least one product keyword, from among the plurality of product categories, based on the knowledge graph;
   determining whether to provide an advertisement related to the user voice based on an interest level of a user in the identified one or more product categories that is obtained according to the utterance history information and an advertisement fatigue level of the user obtained according to the advertisement history information;
   based on a determination to provide the advertisement, obtaining advertisement information based on a target product category identified according to the interest level of the user from among the identified one or more product categories; and
   outputting an advertisement voice via the speaker based on the advertisement information,
   wherein the plurality of product categories included in the knowledge graph are configured in a hierarchical structure, and
   wherein the determining comprises identifying the interest level of the user in the plurality of product categories using weights set differently according to levels of the plurality of product categories, and
   wherein a weight assigned to a high level-product category is set lower than a weight assigned to a low level-product category.

10. The method according to claim 9, wherein the obtaining the advertisement information comprises:
   based on the determination to provide the advertisement, transmitting an advertisement request including information on the target product category to a server; and
   receiving the advertisement information from the server.

11. The method according to claim 9, further comprising:
   identifying a number of times that the user utters the identified one or more product categories during a first predetermined period of time based on the utterance history information, and identifying the interest level of the user in each of the identified one or more product categories based on the identified number of times;
   identifying a number of times that the past advertisement is provided via the speaker during a second predetermined period of time based on the advertisement history information; and
   identifying the advertisement fatigue level of the user based on the identified number of times.

12. The method according to claim 9, wherein the determining whether to provide the advertisement comprises:
   identifying an advertisement concentration level of the user on each of the identified one or more product categories based on the interest level of the user and the advertisement fatigue level of the user;
   identifying the target product category having a highest advertisement concentration level from among the identified one or more product categories; and
   based on the advertisement concentration level of the target product category being equal to or higher than a predetermined threshold value, determining to provide the advertisement.

13. The method according to claim 9, wherein the knowledge graph comprises information on a plurality of attributes corresponding to the plurality of products, and
   wherein the method further comprises:
      obtaining an attribute keyword related to the at least one product keyword from the text; and
      identifying a target attribute related to the attribute keyword from among the plurality of attributes included in the knowledge graph, and
   wherein the outputting the advertisement voice comprises outputting the advertisement voice based on the advertisement information corresponding to the identified target attribute.

14. The method according to claim 9, wherein the knowledge graph comprises information on a plurality of attributes corresponding to the plurality of products,
   wherein the method further comprises:
      identifying one or more attributes for at least one product belonging to the identified one or more product categories based on the knowledge graph; and
      identifying at least one attribute, from among the one or more identified attributes, as a target attribute based on the utterance history information, and
   wherein the outputting the advertisement voice comprises outputting the advertisement voice based on the advertisement information corresponding to the identified target attribute.

15. The method according to claim 14, wherein the identifying the at least one attribute as the target attribute comprises:
   identifying a number of times that the user utters an attribute keyword for each of the one or more identified attributes with respect to the identified one or more product categories during a predetermined period of time based on the utterance history information;
   identifying the interest level of the user in each of the one or more identified attributes based on the identified number of times; and
   identifying an attribute having the identified interest level equal to or higher than a predetermined threshold value, from among the one or more identified attributes, as the target attribute.

* * * * *